US010499034B2

(12) United States Patent
Kim et al.

(10) Patent No.: US 10,499,034 B2
(45) Date of Patent: Dec. 3, 2019

(54) STEREOSCOPIC 3 DIMENSION VIDEO BROADCASTING APPARATUS AND METHOD THEREOF

(71) Applicant: FOUNDATION FOR RESEARCH AND BUSINESS, SEOUL NATIONAL UNIVERSITY OF SCIENCE AND TECHNOLOGY, Seoul (KR)

(72) Inventors: Dong Ho Kim, Seoul (KR); Dongho You, Gyeonggi-do (KR)

(73) Assignee: Fdn. for Res. & Bus., Seoul Nat. Univ. of Sci. & Tech., Seoul (KR)

( * ) Notice: Subject to any disclaimer, the term of this patent is extended or adjusted under 35 U.S.C. 154(b) by 98 days.

(21) Appl. No.: 15/809,478

(22) Filed: Nov. 10, 2017

(65) Prior Publication Data
US 2019/0132571 A1 May 2, 2019

(30) Foreign Application Priority Data

Oct. 30, 2017 (KR) .................. 10-2017-0142410

(51) Int. Cl.
*H04N 13/00* (2018.01)
*H04N 13/178* (2018.01)
(Continued)

(52) U.S. Cl.
CPC ......... *H04N 13/178* (2018.05); *H04N 13/161* (2018.05); *H04N 13/194* (2018.05);
(Continued)

(58) Field of Classification Search
CPC ... H04L 65/607; H04L 1/007; H04L 27/3488; H04L 1/0065
(Continued)

(56) References Cited

U.S. PATENT DOCUMENTS 9,009,762 B2 4/2015 Kim et al.
2007/0165729 A1* 7/2007 Ha ..................... H04L 1/0065
375/260
(Continued)

FOREIGN PATENT DOCUMENTS

GB 2509176 A 6/2014
KR 10-2011-0043438 A 4/2011
(Continued)

OTHER PUBLICATIONS

Alajel, K.M., et al., "Unequal Error Protection Scheme Based Hierarchical 16-QAM for 3-D Video Transmission," IEEE Trans. Consumer Electronics, 58(3): 731-738 (2012).
Akar, G.B., et al., "Mobile Stereo Video Broadcast," MOBILE3DTV, 1-39 (2008).
Huo, Y., et al., "Inter-Layer FEC Decoded Multi-Layer Video Streaming," Globecome 2012, 2113-2118 (2012).

*Primary Examiner* — Albert Kir
(74) *Attorney, Agent, or Firm* — HoustonHogle LLP

(57) ABSTRACT

An apparatus and a method for broadcasting a stereoscopic 3D video, since the LLR operation of each of the HP bitstream and the LP bitstream is provided by the four fundamental arithmetic operations through the logarization for the probability that a video bit for the reception symbol vector is to be transmitted, the operation complexity of the HP bitstream LLR and the LP bitstream LLR is lowered. A high-quality stereoscopic video can be displayed and the left video bitstream is updated by providing the prior bitstream of the left video to the first SISO decoder, thereby improving reliability of the decoding for the left video.

6 Claims, 8 Drawing Sheets

(51) Int. Cl.
*H04N 21/438* (2011.01)
*H04N 21/81* (2011.01)
*H04N 19/166* (2014.01)
*H04N 19/44* (2014.01)
*H04N 21/2383* (2011.01)
*H04N 13/161* (2018.01)
*H04N 13/194* (2018.01)
*H04L 27/00* (2006.01)

(52) U.S. Cl.
CPC .......... *H04N 19/166* (2014.11); *H04N 19/44* (2014.11); *H04N 21/2383* (2013.01); *H04N 21/4382* (2013.01); *H04N 21/816* (2013.01)

(58) Field of Classification Search
USPC .............. 348/43, 46; 375/260, 296; 370/312
See application file for complete search history.

(56) References Cited

U.S. PATENT DOCUMENTS

| | | | | |
|---|---|---|---|---|
| 2012/0154532 A1* | 6/2012 | Faraj | ................... | H04L 27/3488 |
| | | | | 348/43 |
| 2013/0121441 A1* | 5/2013 | Murakami | .............. | H04L 1/007 |
| | | | | 375/296 |
| 2015/0215133 A1* | 7/2015 | Cao | ....................... | H04L 65/607 |
| | | | | 370/312 |

FOREIGN PATENT DOCUMENTS

| | | |
|---|---|---|
| KR | 10-2014-0062373 | 5/2014 |
| KR | 10-2014-0082572 A | 7/2014 |

\* cited by examiner (a) HP bit $b_1$ for hierarchical 16QAM mapping (b) LP bit $b_2$ for hierarchical 16QAM mapping

STEREOSCOPIC 3 DIMENSION VIDEO BROADCASTING APPARATUS AND METHOD THEREOF

CROSS-REFERENCE TO RELATED APPLICATIONS

This application claims the priority of Korean Patent Application No. 10-2017-0142410, filed on Oct. 30, 2017, in the Korean Intellectual Property Office, the disclosure of which is incorporated herein by reference.

BACKGROUND OF THE INVENTION

Field of the Invention

The present invention relates to an apparatus and a method for broadcasting a stereoscopic 3D video, and more specifically, to a technique to processing speed and time for acquiring a high-quality 3D video by lowering complexity of a reception symbol vector log likelihood ration (LLR) operation in an iterative channel decoding process for acquiring the high-quality 3D video using a hierarchical IL-FEC method.

Description of the Related Art

In a wireless broadcasting system, reception quality of various receivers distributed in a wide range may be significantly various. For example, some applications tend to be received by mobile receivers and fixed receivers. Further, it is sometimes preferable to perform a local service insertion (LSI) inserting local content into some cells without influencing national content during broadcasting. A hierarchical modulation adopted as a broadcasting standard such as Digital Video Broadcasting-Terrestrial (DVB-T) and Digital Video Broadcasting-Next Generation Handheld (DVB-NGH) may be used in applications transmitting two bits as the same signal.

For example, the hierarchical modulation may be used for transmitting content having various definitions such as standard definition (SD), high definition (HD), or ultra-high definition (UHD). The high-definition content is transmitted by mapping high priority (HP) bits and low priority (LP) bits and modulating a hierarchical 16 QAM.

In this case, the broadcasting standard defines a plurality of hierarchical values $\alpha$ and a service provider may select a value suitable for the provided application from the hierarchical values $\alpha$. For example, the DVB-T allows a service provider to select the value $\alpha$ of 1, 2, or 4, while the DVB-NGH allows the service provider to select the value $\alpha$ of 1, 2, 3, or 4. The value $\alpha$ affects an inter-stream interference level and affects a trade-off between throughput gain and degradation of performance. Typically, a set of hierarchical values $\alpha$ is provided to each application in use. The hierarchical value $\alpha$ is an important element for acquiring a high-quality 3D video and it is necessary to acquire the hierarchical value $\alpha$ suitable thereto.

In a process of de-mapping a symbol vector received from a destination node receiving the hierarchical-modulated symbol vector on the basis of the appropriate hierarchical value $\alpha$ for iterative channel decoding, there is a disadvantage in that the LLR operation complexity of each of the HP stream and the LP bit is large.

As a result, the applicant of the present invention proposes a method for reducing the processing time and speed of the iterative channel decoding at the rear end by reducing the LLR operation complexity of each of the HP stream and the LP bit.

SUMMARY OF THE INVENTION

In order to solve the problems in the related art, an object of the present invention is to provide an apparatus and a method for broadcasting a stereoscopic 3D video capable of shortening processing time and speed of iterative channel decoding performing iterative decoding to improve BER performance by reducing operation complexity of a HP bit LLR and a LP bit LLR of a reception symbol vector.

Another object of the present invention is to provide an apparatus and a method for broadcasting a stereoscopic 3D video capable of improving reliability of decoding by updating the HP bitstream during iterative channel decoding.

Yet another object of the present invention is to provide an apparatus and a method for broadcasting a stereoscopic 3D video capable of displaying a high-quality 3D video on a screen by acquiring an appropriate hierarchical value in an iterative channel decoding process in which hierarchical modulation is combined with hierarchical 16QAM.

Objects of the present invention are not limited to the aforementioned objects, and other objects and advantages of the present invention, which are not mentioned, can be appreciated by the following description and will be more apparently known by the exemplary embodiments of the present invention. Further, it can be easily understood that the objects and advantages of the present invention may be implemented by means illustrated in claims and combinations thereof.

According to an aspect of the present invention, there is provided an apparatus for broadcasting a stereoscopic 3D video including: a source node that transmits a left video and a right video collected by a plurality of cameras in a transmission symbol vector form by performing 16QAM modulation and hierarchical modulation based on hierarchical values set from a predetermined model after compressing the left video and the right video; and a destination node that acquires the left video and the right video by performing iterative channel decoding after performing hierarchical 16QAM de-mapping based on a predetermined hierarchical value and transmits the acquired left and right videos to a display device with respect to a reception symbol vector in which Gaussian noise is added to the transmission symbol vector at the source node side.

Preferably, the source node may include an IL-FEC channel encoding unit that generates a combined video bitstream $b_{12}$ by combining compressed left video bitstream $b_1$ and right video bitstream $b_2$ of NAL units and performing an exclusive OR operation with respect to the left video $V_1$ and the right video $V_2$ collected through the plurality of cameras; an RSC encoding unit including a plurality of RSC encoders that output parity bitstreams $P_1$ and $P_2$ of the left video and the right video by performing RSC encoding for the compressed left video bitstream and right video bitstream; a concatenate vector generation module that generates a codeword bitstream $c_1$ of the left video and a codeword bitstream $c_{12}$ of the combined video by concatenating the left video bitstream $b_1$, the right video bitstream $b_2$, the parity bitstream $P_2$ of the right video, and the combined video bitstream $b_{12}$ and outputs the generated codeword bitstream $c_1$ of the left video and codeword bitstream $c_{12}$ of the combined video to a HP bitstream and a LP bitstream, respectively; and a hierarchical 16QAM mapping module that maps the received HP bitstream and LP bitstream after performing both 16 QAM and hierarchical modulation based on the hierarchical value set from the predetermined model to transmit the mapped HP bitstream and LP bitstream to the destination node in a transmission symbol vector form.

Preferably, the IL-FEC channel encoding unit may include an interleaver that combines the compressed left video bitstream and right video bitstream; and an exclusive OR operator that outputs a combined video bitstream by operating an exclusive OR with respect to the output bitstream and the right video bitstream of the interleaver.

Preferably, the destination node may include a hierarchical 16QAM de-mapper that acquires the hierarchical value and performs the hierarchical 16QAM de-mapping based on the acquired hierarchical value, and then outputs a left video bitstream LLR, a parity bitstream LLR, a combined video bitstream LLR and a parity bitstream LLR by operating the HP codeword bitstream LLR and the LP codeword bit stream LLR, with respect to the reception symbol vector in which Gaussian noise is added to the transmission symbol vector of the source node side, respectively; an iterative channel decoder that acquires a left video stream and a right video stream by performing a predetermined number of iterative channel decoding with respect to the generated left video bitstream LLR, parity bitstream LLR, combined video bitstream LLR and parity bitstream LLR; and an encoding unit including a plurality of encoders that transmits a left video and a right video to a display device after compressing and encoding the acquired left and right video bitstreams, respectively.

Preferably, in the hierarchical 16QAM de-mapper, each operation relation of a LP codeword bitstream LLR and a HP codeword bitstream LLR, drawn through logarization for the probability that the received reception symbol vector is to be transmitted, is provided by the four fundamental arithmetic operations, in order to reduce operation complexity of the LP codeword bitstream LLR and the HP codeword bitstream LLR.

Preferably, the iterative channel decoder may include a first SISO decoder that generates an additional bitstream LLR by performing soft decoding by inputting the left video bitstream LLR and the parity bitstream LLR and outputs the left video bitstream; an interleaver that outputs an interleaved additional bitstream LLR by rearranging a sequence of the additional bitstream LLR of the first SISO decoder; a first LLR operator that generates a prior bitstream of the right video by combining the interleaved additional bitstream and the combined video bitstream as the input based on the LLR; a second SISO decoder that generates an additional bitstream of the left video and outputs the right video bitstream by soft decoding the prior bitstream of the right video and the parity bitstream of the combined video of the first LLR operator as the input; a second LLR operator that generates an additional bitstream of the left video by combining the additional bitstream of the right video of the second SISIO decoder and the combined video bitstream based on the LLR; a deinterleaver that generates a prior bitstream of the left video through deinterleaving and exclusive OR operation with respect to the additional bitstream of the left video; and an exclusive OR operator that updates the left video bitstream by providing the prior bitstream of the left video of the deinterleaver to the first SISO decoder through the exclusive OR operation to improve reliability of the decoding for the left video.

Preferably, the hierarchical value may be provided to acquire bit error rate (BER) performance based on noise for each predetermined hierarchical value of left and right video bitstreams output from the first and second SISO decoders of the iterative channel decoder, set a hierarchical value having the acquired low BER performance, draw an average PSNR for each of the left video bitstream and the right video bitstream reconfigured based on the predetermined hierarchical value, and acquire, as the appropriate hierarchical value, a hierarchical value in which a sum of the drawn left video bitstream and right video bitstream exceeds a predetermined target average PSNR and each average PSNR has a predetermined minimum required PSNR.

According to another aspect of the present invention, there is provided an apparatus for broadcasting a stereoscopic 3D video including: an IL-FEC channel encoding unit that generates a combined video bitstream $b_{12}$ by combining compressed left video bitstream $b_1$ and right video bitstream $b_2$ of NAL units and performing an exclusive OR operation with respect to the left video $V_1$ and the right video $V_2$ collected through the plurality of cameras; an RSC encoding unit including a plurality of RSC encoders that output parity bitstreams $P_1$ and $P_2$ of the left video and the right video by performing RSC encoding for the compressed left video bitstream and right video bitstream, respectively; a concatenate vector generation module that generates a codeword bitstream $c_1$ of the left video and a codeword bitstream $c_{12}$ of the combined video by concatenating the left video bitstream $b_1$, the right video bitstream $b_2$, the parity bitstream $P_2$ of the right video, and the combined video bitstream $b_{12}$ and outputs the generated codeword bitstream $c_1$ of the left video and codeword bitstream $c_{12}$ of the combined video to a HP bitstream and a LP bitstream, respectively; and a hierarchical 16QAM mapping module that maps the received HP bitstream and LP bitstream after performing both 16 QAM and hierarchical modulation based on the hierarchical value set from the predetermined model to transmit the mapped HP bitstream and LP bitstream to the destination node in a transmission symbol vector form.

Preferably, the IL-FEC channel encoding unit may include an interleaver that combines the compressed left video bitstream and right video bitstream; and an exclusive OR operator that outputs a combined video bitstream by operating an exclusive OR with respect to the output bitstream and the right video bitstream of the interleaver.

According to yet another aspect of the present invention, there is provided an apparatus for broadcasting a stereoscopic 3D video including: a hierarchical 16QAM de-mapper that acquires an appropriate hierarchical value, performs the hierarchical 16QAM de-mapping based on the acquired hierarchical value, with respect to the reception symbol vector, and then outputs a left video bitstream LLR, a parity bitstream LLR, a combined video bitstream LLR and a parity bitstream LLR by operating the LP codeword bitstream LLR and the HP codeword bitstream LLR, respectively; an iterative channel decoder that acquires a left video stream and a right video stream by performing a predetermined number of iterative channel decoding with respect to the generated left video bitstream LLR, parity bitstream LLR, combined video bitstream LLR and parity bitstream LLR; and an encoding unit including a plurality of encoders that transmits a left video and a right video to a display device after compressing and encoding the acquired left and right video bitstreams, respectively.

Preferably, in the hierarchical 16QAM de-mapper, each operation relation of a LP codeword bitstream LLR and a HP codeword bitstream LLR drawn through logarization for the probability that the received reception symbol vector is to be transmitted is provided by the four fundamental arithmetic operations, in order to reduce operation complexity of the LP codeword bitstream LLR and the HP codeword bitstream LLR.

Preferably, the iterative channel decoder may include a first SISO decoder that generates an additional bitstream LLR by performing soft decoding by inputting the left video bitstream LLR and the parity bitstream LLR and outputs the left video bitstream; an interleaver that outputs an interleaved additional bitstream LLR by rearranging a sequence of the additional bitstream LLR of the first SISO decoder; a first LLR operator that generates a prior bitstream of the right video by combining the interleaved additional bitstream and the combined video bitstream as the input based on the LLR; a second SISO decoder that generates an additional bitstream of the left video and outputs the right video bitstream by soft decoding the prior bitstream of the right video and the parity bitstream of the combined video of the first LLR operator as the input; a second LLR operator that generates an additional bitstream of the left video by combining the additional bitstream of the right video of the second SISIO decoder and the combined video bitstream based on the LLR; a deinterleaver that generates a prior bitstream of the left video through deinterleaving and exclusive OR operation with respect to the additional bitstream of the left video; and an exclusive OR operator that updates the left video bitstream by providing the prior bitstream of the left video of the deinterleaver to the first SISO decoder through the exclusive OR operation to improve reliability of the decoding for the left video.

Preferably, the hierarchical value may be provided to acquire bit error rate (BER) performance based on noise for each predetermined hierarchical value of left and right video bitstreams output from the first and second SISO decoders of the iterative channel decoder, set a hierarchical value having the acquired low BER performance, draw an average PSNR for each of the left video bitstream and the right video bitstream reconfigured based on the predetermined hierarchical value, and acquire, as the appropriate hierarchical value, a hierarchical value in which a sum of the drawn left video bitstream and right video bitstream exceeds a predetermined target average PSNR and each average PSNR has a predetermined minimum required PSNR.

According to still another aspect of the present invention, there is provided a method for broadcasting a stereoscopic 3D video including: transmitting a left video and a right video collected by a plurality of cameras in a transmission symbol vector form by performing 16QAM modulation and hierarchical modulation based on hierarchical values set from a predetermined model after compressing the left video and the right video; and acquiring the left video and the right video by performing iterative channel decoding after performing hierarchical 16QAM de-mapping based on an appropriate hierarchical value and transmitting the acquired left and right videos to a display device with respect to a reception symbol vector in which Gaussian noise is added to the transmission symbol vector at the source node side, in which the process of performing the hierarchical 16QAM de-mapping based on the predetermined hierarchical value further includes providing each operation relation of a LP codeword bitstream LLR and a HP codeword bitstream LLR drawn through logarization for the probability that the received reception symbol vector is to be transmitted as the four fundamental arithmetic operations, in order to reduce operation complexity of the LP codeword bitstream LLR and the HP codeword bitstream LLR.

Preferably, the iterative channel decoding process may include generating an additional bit stream by performing soft decoding by the first SISO decoder by inputting a left video bitstream and a parity bitstream; rearranging a sequence of the additional bitstream and then transmitting the rearranged sequence to the second SISO decoder as an input; performing soft decoding by inputting the additional bitstream rearranged in the second SISO decoder and the parity bit; generating a prior bitstream of the left video after inverse-arranging the sequence through deinterleaving for the additional bitstream; and updating the left video bitstream by providing the prior bitstream of the left video of the deinterleaver to the first SISO decoder through an exclusive OR operation to improve reliability of the decoding for the left video.

Preferably, the process of acquiring the appropriate hierarchical value may include: acquiring bit error rate (BER) performance based on noise for each predetermined hierarchical value of left and right video bitstreams output from the first and second SISO decoders; setting a hierarchical value having the acquired low BER performance; drawing an average PSNR for each of the left video bitstream and the right video bitstream reconfigured based on the predetermined hierarchical value; and acquiring, as the appropriate hierarchical value, a hierarchical value in which a sum of the drawn left video bitstream and right video bitstream exceeds a predetermined target average PSNR and each average PSNR has a predetermined minimum required PSNR.

According to the present invention, the LLR operation of each of the HP bitstream and the LP bitstream is provided by the four fundamental arithmetic operations through the logarization for the probability that a video bit for the reception symbol vector is to be transmitted, thereby lowering the operation complexity of the HP bitstream LLR and the LP bitstream LLR and improving the de-mapping processing speed for the reception symbol vector y.

In addition, when performing the iterative channel decoding, the iterative channel decoding is performed by acquiring, as the appropriate hierarchical value, a hierarchical value in which a sum of the drawn left video bitstream and right video bitstream exceeds a predetermined target average PSNR and each average PSNR has a predetermined minimum required PSNR, thereby displaying a high-quality stereoscopic video.

Further, the left video bitstream is updated by providing the prior bitstream of the left video to the first SISO decoder, thereby improving reliability of the decoding for the left video.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
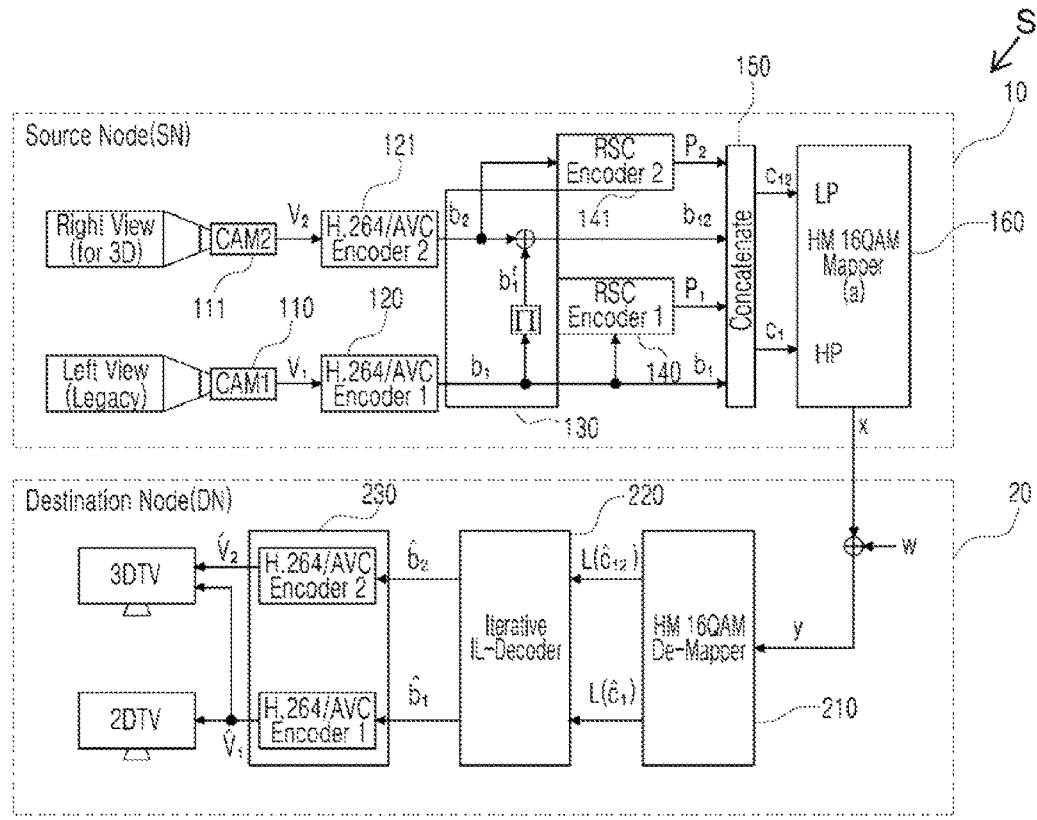
FIG. 1 is a diagram showing a schematic configuration of a broadcasting system to which an exemplary embodiment of the present invention is applied.

Hereinafter, exemplary embodiments of the present invention will be described in more detail with reference to the accompanying drawings.

Various advantages and features of the present invention and methods accomplishing thereof will become apparent from the following description of exemplary embodiments with reference to the accompanying drawings. However, the present invention is not limited to the following exemplary embodiments but may be implemented in various different forms. The exemplary embodiments are provided only to complete disclosure of the present invention and to fully provide a person having ordinary skill in the art to which the present invention pertains with the category of the invention, and the present invention will be defined by the appended claims.

Terms used in the present specification will be briefly described and the present invention will be described in detail.

Terms used in the present invention adopt general terms which are currently widely used as possible by considering functions in the present invention, but the terms may be changed depending on an intention of those skilled in the art, a precedent, and emergence of new technology. Further, in a specific case, a term which an applicant arbitrarily selects is present and in this case, a meaning of the term will be disclosed in detail in a corresponding description part of the invention. Accordingly, a term used in the present invention should be defined based on not just a name of the term but a meaning of the term and contents throughout the present invention.

Throughout the specification and the claims, unless explicitly described to the contrary, the term "comprise" will be understood to imply the inclusion of stated elements but not the exclusion of any other elements. In addition, a term 'unit' used in the specification means software or a hardware component such as FPGA or ASIC and the 'unit' performs certain roles. However, the 'unit' is not a meaning limited to software or hardware. The 'unit' may be configured to be positioned in an addressable storage medium and configured to regenerate one or more processors.

Therefore, as one example, the 'unit' includes components such as software components, object oriented software components, class components, and task components, processes, functions, attributes, procedures, subroutines, segments of a program code, drivers, firmware, a microcode, a circuit, data, a database, data structures, tables, arrays, and variables. Functions provided in the components and 'units' may be joined as a smaller number of components and 'units' or further separated into additional components and 'units'.

The exemplary embodiment of the present invention will be described more fully hereinafter with reference to the accompanying drawings so that those skilled in the art to which the present invention pertains can be easily implemented. In addition, a part irrelevant to the description will be omitted to clearly describe the exemplary embodiments of the present invention.

Hereinafter, a history according to an exemplary embodiment of the present invention will be described in detail with reference to the accompanying drawings.

FIG. 1 is a diagram showing an apparatus S for processing left and right video signals based on interlayer forward error correction (IL-FEC) and hierarchical quadrature amplitude modulation (16QAM) according to the exemplary embodiment of the present invention. Referring to FIG. 1, the apparatus S includes a source node 10 and a destination node 20. The source node 10 compresses and encodes the left and right video signals acquired from a camera through the IL-FEC and hierarchical 16QAM mapper to transmit the compressed and encoded left and right video signals to the destination node 20 in a transmission symbol vector x form, and the destination node 20 may transmit a reception symbol vector y to a display device TV by performing iterative channel decoding.

Herein, the source node 10 may include cameras 110 and 111, H264/AVC encoders 120 and 121, an IL-FEC channel encoding unit 130, recursive systematic convolution (RSC) encoders 140 and 141, a concatenate vector generation module 150, and a hierarchical 16QAM mapping module 160.

A left video and a right video acquired from the respective cameras 110 and 111 are transmitted to the H264/AVC encoders 120 and 121, and in this case, the H264/AVC encoders 120 and 121 may compress the left video and the right video based on a predetermined video standard compression algorithm.

That is, with respect of a video signal $V_k=\{V_k^1, V_k^2, \ldots, V_k^I\}$ included in an I frame, a compressed k-th video bitstream $b_k$ is defined as $b_k=\{b_k^1, b_k^2, \ldots, b_k^n\}$ Herein, k is a positive integer, $1 \leq i \leq I$, $1 \leq n \leq N$, and n is defined by a unit of an n-th network abstraction layer (hereinafter, abbreviated as an NAL). The video bitstream bk is divided into NAL units, and in this case, the total number N of NALs is equal to the number of compressed frames I. That is, N=I.

Accordingly, since the n-th NAL unit includes M bits $(b_k^n=\{b_k^{n_1}, b_k^{n_2}, \ldots, b_k^{n_m}\}, n_1 \leq n_m \leq n_M)$, and the difference between the left video signal and the right video signal is small, the lengths of the left and right video bitstream $b_k^n$ (k=1 and 2) are equal to each other.

That is, the left video signal and the right video signal received by the cameras 110 and 111 are transmitted to the IL-FEC channel encoding unit 130 via the H264/AVC encoders 120 and 121, respectively.

In this case, the H264/AVC encoders 120 and 121 output left and right video bitstreams $b_1$ and $b_2$ by NAL units, respectively.

The IL-FEC channel encoding unit 130 may be provided by a universal mobile telecommunication system (UMPS) interleaver $\Pi( )$ (hereinafter, abbreviated as an interleaver) and an exclusive OR operator $\oplus$. As a result, the IL-FEC channel encoding unit 130 outputs a combined video bitstream $b_{12}$ acquired by combining the left video bitstream $b_1$ and the right video bitstream $b_2$ and the combined video bitstream $b_{12}$ is expressed by $b_{12}=\Pi(b_1)\oplus b_2=b_1'\oplus b_2$. Herein, the combined video bitstream $b_{12}$ is provided as a redundancy of the left video bitstream $b_1$.

The left video bitstream $b_1$ and the combined video bitstream $b_{12}$ are transmitted to the RSC encoders 140 and 141, respectively, and as a result, the left video bitstream $b_1$ and the combined video bitstream $b_{12}$ are encoded by the RSC encoders 140 and 141 to output a video bitstream $b_{k'}$, and a parity bitstream $p_{k'}$. A series of processes of encoding the left video bitstream $b_1$ and the combined video bitstream $b_{12}$ by the RSC encoders 140 and 141 may be understood by those skilled in the art related with the exemplary embodiment of the present invention.

In addition, the encoded parity bitstream $p_{k'}$ and the video bitstream $b_{k'}$ output a codeword bitstream $c_{k'}$ by the concatenate vector generation module 150 and in this case, the codeword bitstream $c_{k'}$ is represented by $c_{k'} = \{c_{k'}^1, c_{k'}^2, \ldots, c_{k'}^n\}$ (k'=1, 12). That is, the codeword bitstream $c_{k'}$ is defined as a concatenate vector between the parity bitstream $p_{k'}$ and the video bitstream $b_{k'}$, the codeword bitstream $c_{k'}$ is defined as $c_{k'} = b_{k'} \boxtimes p_{k'}$, and $\boxtimes$ is defined as a serial concatenate for the video bitstream $b_{k'} = \{b_{k'}^1, b_{k'}^2, \ldots, b_{k'}^n\}$ and the parity bitstream $p_{k'} = \{p_{k'}^1, p_{k'}^2, \ldots, p_{k'}^n\}$.

In addition, the encoded codeword bitstream $c_{k'} = \{c_{k'}^1, c_{k'}^2, \ldots, c_{k'}^n\}$ is transmitted to the hierarchical 16QAM mapping module 160 for strong error correction and the hierarchical 16QAM mapping module 160 performs the hierarchical 16QAM mapping with respect to the codeword bitstream $c_1$ of the NAL unit. In this case, the codeword bitstreams $c_1$ and $c_{12}$ of the NAL unit are input to the hierarchical 16QAM mapping module 160 as the HP bitstream and the LP bitstream, respectively.

Figure 2:
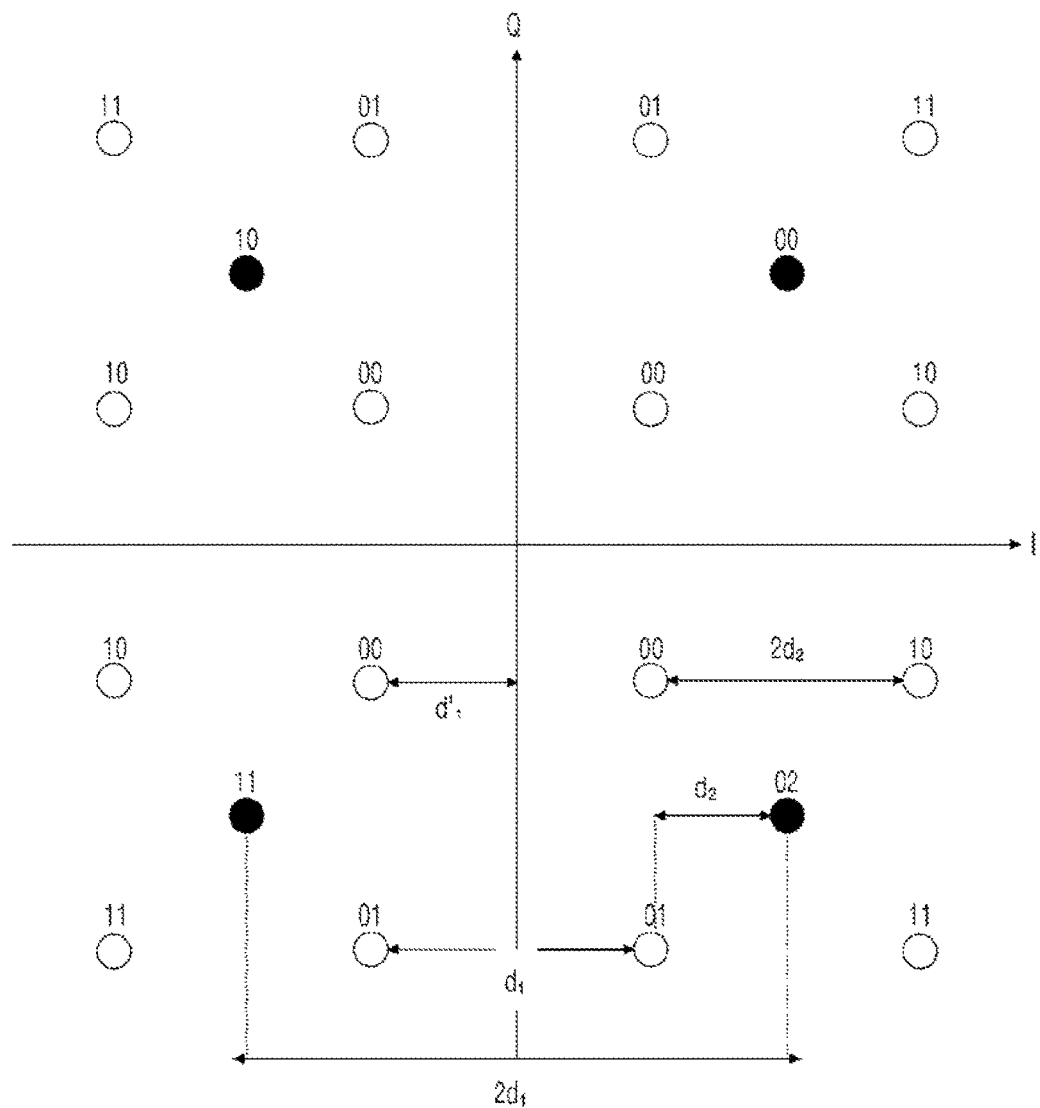
FIG. 2 is a diagram illustrating a hierarchical modulation constellation according to the exemplary embodiment of the present invention.

FIG. 2 shows hierarchical-modulated virtual black points and actual transmission symbol white points by the hierarchical 16QAM mapping module 160 shown in FIG. 1, and an actual transmission symbol vector $x_{n_m}$ is represented by Equation 1 below.

$$x_{n_m} = K\{f_{(\alpha)}^{16}(c_1^{(2n_m-1)}, c_{12}^{(2n_m-1)}, c_1^{2n_m}, c_{12}^{2n_m})\} \quad \text{Equation 1}$$

Herein, $x_{n_m} \in x^n$ ($n_1 \leq n_m \leq n_M$ and $1 \leq n \leq N$) is satisfied and $f_{(\alpha)}^{16}()$ defined as a hierarchical 16QAM mapper having a hierarchical value $\alpha = d_1/d_2$. A distance d' from the hierarchical value $\alpha = d_1/d_2$ satisfies $d_1' = d_1/2$, $2d_1$ represents a distance between virtual center points of the quadrant, and $2d_2$ represents a distance between actually transmitted symbols of each quadrant.

In addition, the parameter k is defined as a scaling factor with respect to an average value of average symbol energy. Herein, the video bitstream $b_1$ of the NAL unit, which is the left video, is defined as the HP bitstream, and the video bitstream $b_2$ of the NAL unit, which is the right video, is defined as the LP bitstream.

In this case, when the hierarchical value $\alpha$ for the HP codeword bitstream $c_1$ mapped with the HP bitstream is increased, the LP codeword bitstream $c_{12}$ mapped with the LP bitstream is decreased. Reversely, when the hierarchical value $\alpha$ for the LP codeword bitstream $c_{12}$ is decreased, the HP codeword bitstream $c_1$ is increased. As a result, a high-quality 3D video may not be acquired by the increased hierarchical value $\alpha$ of the codeword $c_1$ due to the decrease of the LP codeword bitstream $c_1$. As a result, it is very important that the hierarchical 16QAM mapping module 160 acquires an appropriate hierarchical value $\alpha$ in order to improve stereoscopic 3D video quality based on a predetermined model. The appropriate hierarchical value $\alpha$ is acquired based on the predetermined model for the PSNR.

In addition, a transmission symbol vector $x_{n_m}$ is output by performing the hierarchical 16QAM based on the acquired hierarchical value $\alpha$ and the output transmission symbol vector $x_{n_m}$ is transmitted to the destination node 20.

As illustrated in FIG. 1, the destination node 20 may include a hierarchical 16QAM de-mapper 210, an iterative channel decoder 220, and a H264/AVC decoder 230.

A reception symbol vector y arriving at the destination node 20 is transmitted to the hierarchical 16QAM de-mapper 210, the hierarchical 16QAM de-mapper 210 adds a predetermined Gaussian noise w to the received transmission symbol vector x, and the reception symbol vector y added with the Gaussian noise w is represented by Equation 2 below.

That is, when the reception symbol vector y is $y = \{y^1, y^2, \ldots, y^n\}$, $$y = x + w \quad \text{(Equation 2)}$$

is satisfied.

Herein, $$x = \cup_{n=1}^{N_X} x^n \quad \text{(Equation 3)}$$

is satisfied and herein, $x^n = \{x_{n_1}, x_{n_2}, \ldots, x_{n_m}\}$.

In addition, the hierarchical 16QAM de-mapper 210 operates each codeword bitstream $\hat{c}_{k'}^n$ log-likelihood ratio (hereinafter, abbreviated as an LLR) as the reception symbol vector y of the received n-th NAL unit and the codeword bitstream $\hat{c}_{k'}^n$ LLR is represented by Equation 4 below.

$$\hat{f}_{(\alpha)}^{16}(y^n) = L(\hat{c}_{k'}^n) \quad \text{Equation 4}$$

Herein, k' a is 1 and 12, $\hat{f}_{(\alpha)}^{16}()$ represents soft hierarchical 16QAM de-mapping function, and $L()$ represents an LLR value.

In addition, when the Gaussian noise w is defined as a probability distribution function, Equation 5 below is satisfied.

$$p(\omega) = \frac{1}{\sqrt{2\pi\sigma^2}} e^{\frac{-(\omega-\mu)^2}{2\sigma^2}} \quad \text{Equation 5}$$

Herein, $\mu = 0$ and a parameter is $\sigma^2 = N_0/2$.

Hereinafter, a process of operating the LLR for each bit of the codeword bitstream $\hat{c}_{k'}^n$ of the NAL unit will be described.

For example, a first video bit to a fourth video bit $b_1$, $b_2$, $b_3$, and $b_4$ in each constellation point are considered as two bits through independent 4 pulse amplitude modulation (PAM) for a real axis I and an imaginary axis Q and the mapping for the hierarchical modulation is shown in Table 1 below.

TABLE 1

| Constellation mapping for hierarchical 16QAM | | | |
| --- | --- | --- | --- |
| $b_1 b_2$ | I | $b_3 b_4$ | Q |
| 11 | $-d_1 - d_2$ | 11 | $-d_1 - d_2$ |
| 10 | $-d_1 + d_2$ | 10 | $-d_1 + d_2$ |
| 01 | $d_1 - d_2$ | 01 | $d_1 - d_2$ |
| 00 | $d_1 - d_2$ | 00 | $d_1 - d_2$ |

Herein, $b_1 = c_1^{(2m_n-1)}$ and $b_3 = c_1^{2m_n}$ are HP codeword bits and $b_2 = c_{12}^{(2m_n-1)}$ and $b_4 = c_{12}^{2m_n}$ are LP codeword bits.

For hierarchical 16QAM de-mapping, a probability $P(b_m|y)$ to be transmitted with each video bit br (r=1, 2, 3, 4) for the given reception symbol vector y of the NAL unit satisfies Equation 6 below.

$$P(b_m \mid y) = \frac{P(b_m \mid y) p(b_m)}{p(y)} \quad \text{Equation 6}$$

In this case, the maximum $P(b_m|y)$ is the same as the maximum $P(y|b_m)$ because all probabilities of the same constellation points are the same as each other.

Figure 3:
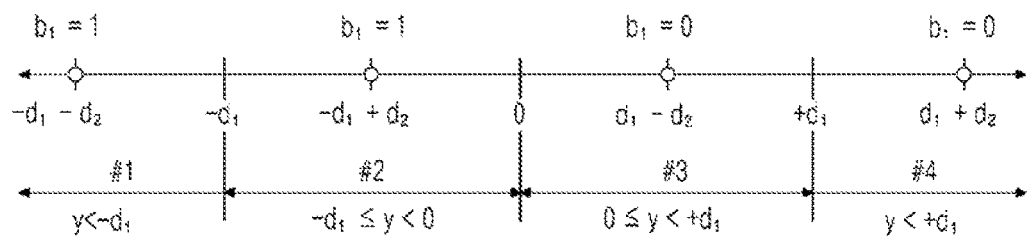
FIG. 3 is an exemplary diagram showing a mapping state of hierarchical 16QAM in the broadcasting system according to the exemplary embodiment of the present invention.
Figure 3:
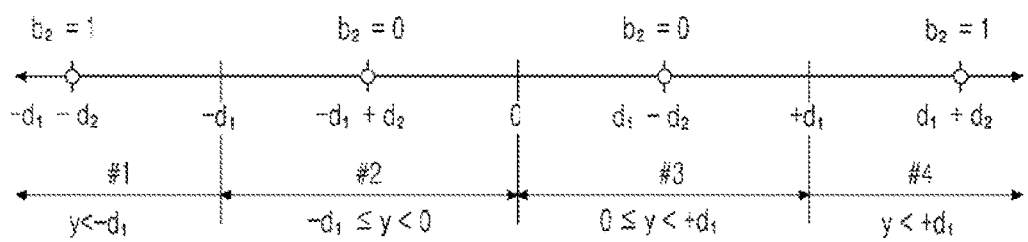

FIG. 3 is a diagram showing a hierarchical 16QAM constellation mapping state of each of the HP bits $b_1$ and $b_3$ and the LP bits $b_2$ and $b_4$. Referring to FIG. 3A, a process of drawing the HP bits $b_1$ and $b_3$ LLR Operation Equation will be described. Herein, since the same rule is applied to the HP bits $b_1$ and $b_3$, the HP bit $b_1$ LLR satisfies Equation 7 below.

$$\frac{P(y \mid b_1 = 0)}{P(y \mid b_1 = 1)} = \frac{e^{\frac{-(y-(d_1-d_2))^2}{2\sigma^2}} + e^{\frac{-(y-(d_1+d_2))^2}{2\sigma^2}}}{e^{\frac{-(y-(-d_1-d_2))^2}{2\sigma^2}} + e^{\frac{-(y-(-d_1+d_2))^2}{2\sigma^2}}} \quad \text{Equation 7}$$

Herein, in a period 1 of $y<-d_1$, the HP bit $b_1$ LLR has a low contribution ratio of a constellation point $d_1+d_2$ of a numerator and $-d_1+d_2$ of a denominator.

Accordingly, the LLR for the HP bit $b_1$ is represented by Equation 8 below.

$$\frac{P(y \mid b_1 = 0)}{P(y \mid b_1 = 1)} \approx \frac{e^{\frac{-(y-(d_1-d_2))^2}{2\sigma^2}}}{e^{\frac{-(y-(-d_1-d_2))^2}{2\sigma^2}}} \quad \text{Equation 8}$$

When both sides are summarized, the LLR for the HP bit $b_1$ may be represented by Equation 9 below.

$$\ln\left(\frac{P(y \mid b_1 = 0)}{P(y \mid b_1 = 1)}\right) \approx \ln\left(\frac{e^{\frac{-(y-(d_1-d_2))^2}{2\sigma^2}}}{e^{\frac{-(y-(-d_1-d_2))^2}{2\sigma^2}}}\right) \quad \text{Equation 9}$$

$$= \frac{1}{2\sigma^2}\{(y-(-d_1-d_2))^2 - (y-(-d_1+d_2))^2\}$$

$$= \frac{1}{\sigma^2} 2d_1(y + d_2)$$

In addition, in Periods 2 and 3 of $-d_1<y<+d_1$, since $d_1+d_2$ of the numerator and $-d_1-d_2$ of the denominator have small values enough to be negligible, the HP bit $b_1$ LLR may be represented by Equation 10 below.

$$\frac{P(y \mid b_1 = 0)}{P(y \mid b_1 = 1)} \approx \frac{e^{\frac{-(y-(d_1-d_2))^2}{2\sigma^2}}}{e^{\frac{-(y-(-d_1-d_2))^2}{2\sigma^2}}} \quad \text{Equation 10}$$

When both sides of Equation 18 are logarized and summarized, the HP bit $b_1$ LLR is represented by Equation 11 below.

$$\ln\left(\frac{P(y \mid b_1 = 0)}{P(y \mid b_1 = 1)}\right) \approx \ln\left(\frac{e^{\frac{-(y-(d_1-d_2))^2}{2\sigma^2}}}{e^{\frac{-(y-(-d_1-d_2))^2}{2\sigma^2}}}\right) \quad \text{Equation 11}$$

$$= \frac{1}{2\sigma^2}\{(y-(-d_1+d_2))^2 - (y-(-d_1-d_2))^2\}$$

$$= \frac{1}{\sigma^2} 2y(d_1 - d_2)$$

Meanwhile, in Period 4 of $y \geq +d_1$, since $d_1-d_2$ of the numerator and $-d_1-d_2$ of the denominator have small values enough to be negligible, the HP bit $b_1$ LLR may be represented by Equation 12 below.

$$\frac{P(y \mid b_1 = 0)}{P(y \mid b_1 = 1)} \approx \frac{e^{\frac{-(y-(d_1+d_2))^2}{2\sigma^2}}}{e^{\frac{-(y-(-d_1+d_2))^2}{2\sigma^2}}} \quad \text{Equation 12}$$

In addition, when both sides of the HP bit $b_1$ LLR are logarized and summarized, the HP bit $b_1$ LLR may be represented by Equation 13 below.

$$\ln\left(\frac{P(y \mid b_1 = 0)}{P(y \mid b_1 = 1)}\right) \approx \ln\left(\frac{e^{\frac{-(y-(d_1+d_2))^2}{2\sigma^2}}}{e^{\frac{-(y-(-d_1+d_2))^2}{2\sigma^2}}}\right) \quad \text{Equation 13}$$

$$= \frac{1}{2\sigma^2}\{(y-(-d_1+d_2))^2 - (y-(d_1+d_2))^2\}$$

$$= \frac{1}{\sigma^2} 2d_1(y - d_2)$$

Accordingly, the HP codeword bit $\hat{c}_k{}^n$ LLR $L(\hat{c}_1{}^n)=\{L(c_1{}^{n_1}), L(c_1{}^{n_2}), \ldots, L(c_1{}^{n_m})\}$ satisfies Equation 14 below.

$$L(\hat{c}_1^n) = \begin{cases} \frac{1}{\sigma^2} 2d_1(y^n + d_2), & \text{if } y^n < -d_1 \\ \frac{1}{\sigma^2} 2y^n(d_1 - d_2), & \text{if } -d_1 \leq y^n < d_1 \\ \frac{1}{\sigma^2} 2d_1(y^n - d_2), & \text{if } y^n \geq d_1 \end{cases} \quad \text{Equation 14}$$

Herein, $1 \leq n \leq N$, that is, n is a positive integer.

Referring to FIG. 3B, a process of operating the LP bits $b_2$ and $b_4$ LLR is as follows. Herein, since the same rule is applied to the LP bit $b_2$ and the LP bit $b_4$, the HP bit $b_2$ LLR satisfies Equation 15 below.

$$\frac{P(y \mid b_2 = 0)}{P(y \mid b_2 = 1)} \approx \frac{e^{\frac{-(y-(d_1+d_2))^2}{2\sigma^2}} + e^{\frac{-(y-(d_1-d_2))^2}{2\sigma^2}}}{e^{\frac{-(y-(-d_1-d_2))^2}{2\sigma^2}} + e^{\frac{-(y-(-d_1+d_2))^2}{2\sigma^2}}} \quad \text{Equation 15}$$

Herein, in Periods 1 and 2 of $y<0$, since the constellation point $d_1+d_2$ of the numerator and $d_1-d_2$ of the denominator of the LP bit $b_1$ LLR have small values enough to be negligible, the LP bit $b_1$ LLR is represented by Equation 16 below.

$$\frac{P(y \mid b_2 = 0)}{P(y \mid b_2 = 1)} \approx \frac{e^{\frac{-(y-(-d_1+d_2))^2}{2\sigma^2}}}{e^{\frac{-(y-(-d_1-d_2))^2}{2\sigma^2}}} \quad \text{Equation 16}$$

When both sides of the LP bit $b_2$ LLR are logarized and summarized, the LP bit $b_2$ LLR is represented by Equation 17 below.

$$\ln\left(\frac{P(y \mid b_2 = 0)}{P(y \mid b_2 = 1)}\right) \approx \ln\left(\frac{e^{\frac{-(y-(-d_1+d_2))^2}{2\sigma^2}}}{e^{\frac{-(y-(-d_1-d_2))^2}{2\sigma^2}}}\right) \quad \text{Equation 17}$$

$$= \frac{1}{2\sigma^2}\{(y-(-d_1-d_2))^2 - (y-(-d_1+d_2))^2\}$$

$$= \frac{1}{\sigma^2} 2d_2(y+d_1)$$

Herein, in Periods 3 and 4 of y≥0, since the constellation point $-d_1+d_2$ of the numerator and $-d_1-d_2$ of the denominator of the LP bit $b_2$ LLR have small values enough to be negligible, the LP bit $b_2$ LLR is represented by Equation 18 below.

$$\frac{P(y \mid b_2 = 0)}{P(y \mid b_2 = 1)} \approx \frac{e^{\frac{-(y-(d_1-d_2))^2}{2\sigma^2}}}{e^{\frac{-(y-(d_1+d_2))^2}{2\sigma^2}}} \quad \text{Equation 18}$$

In addition, when both sides of the LP bit $b_2$ LLR are logarized and summarized, the LP bit $b_2$ LLR satisfies Equation 19 below.

$$\ln\left(\frac{P(y \mid b_2 = 0)}{P(y \mid b_2 = 1)}\right) \approx \ln\left(\frac{e^{\frac{-(y-(d_1-d_2))^2}{2\sigma^2}}}{e^{\frac{-(y-(d_1+d_2))^2}{2\sigma^2}}}\right) \quad \text{Equation 19}$$

$$= \frac{1}{2\sigma^2}\{(y-(d_1+d_2))^2 - (y-(d_1-d_2))^2\}$$

$$= \frac{1}{\sigma^2} 2d_2(-y+d_1)$$

Accordingly, the LP bit $\hat{c}_k^n$ LLR $L(\hat{c}_{12}^n) = \{L(c_{12}^{n_1}), L(c_{12}^{n_2}), \ldots, L(c_{12}^{n_m})\}$ satisfies Equation 20 below.

$$L(\hat{c}_{12}^n) = \begin{cases} \frac{1}{\sigma^2} 2d_2(y^n + d_1), & \text{if } y^n < 0 \\ \frac{1}{\sigma^2} 2d_2(-y^n + d_1), & \text{if } y^n \geq 0 \end{cases} \quad \text{Equation 20}$$

As illustrated in Equations 14 and 20, it can be seen that the LLR operation complexity of each of the HP bit and the LP bit is low through logarization for the probability $P(b_m|y)$ that the bit br (r=1, 2, 3, 4) for the given reception symbol vector y is to be transmitted, and as a result, a de-mapping processing speed for the reception symbol vector y is improved.

In addition, since the codeword LLR $L(\hat{c}_{12}^n)$ is $L(\hat{c}_k^n) = \{L(\hat{b}_{k'}^n), L(\hat{p}_{k'}^n)\}$ and k'=1, 12, the hierarchical 16QAM de-mapper 210 outputs four de-mapped video bitstreams and four parity bitstream LLRs $L(\hat{b}_1^n)$, $L(\hat{b}_{12}^n)$, $L(\hat{p}_1^n)$ and $L(\hat{p}_{12}^n)$ and the four de-mapped video bitstreams and the parity bitstream LLRs $L(\hat{b}_1^n)$, $L(\hat{b}_{12}^n)$, $L(\hat{p}_1^n)$, and $L(\hat{p}_{12}^n)$ are transmitted to the iterative channel decoder 220.

Figure 4:
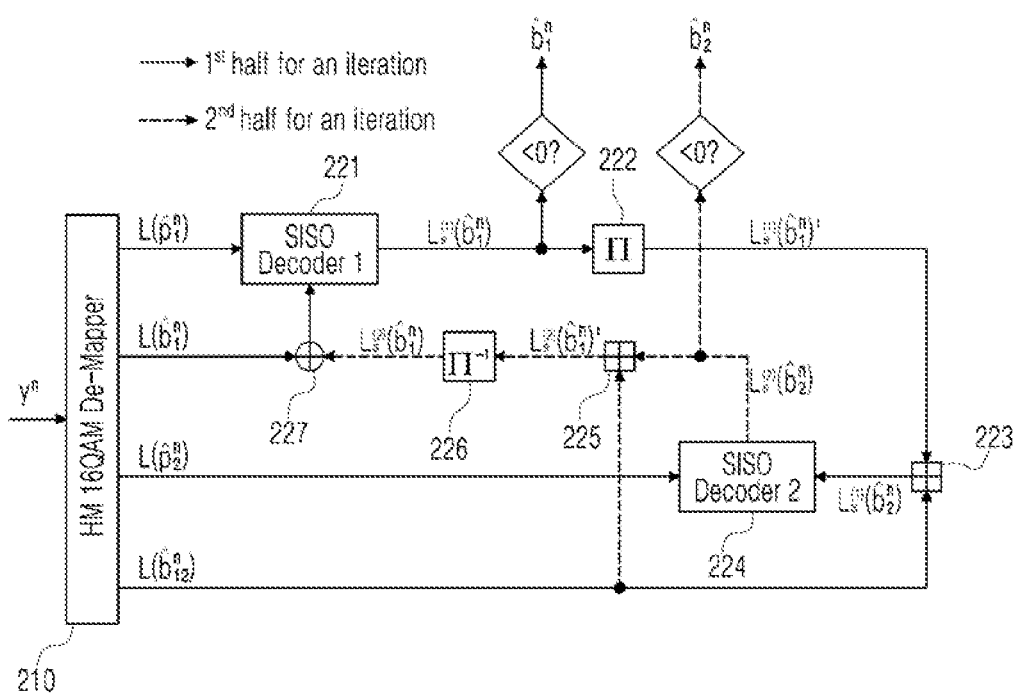
FIG. 4 is a diagram showing a detailed configuration of an iterative channel decoder in the broadcasting system according to the exemplary embodiment of the present invention.

FIG. 4 is a diagram showing a configuration of the iterative channel decoder 220 of FIG. 1 in detail. Referring to FIG. 4, the iterative channel decoder 220 may include a first soft in soft out (SISO) decoder 221, an interleaver 222, a first LLR operator 223, a second SISO decoder 224, a second LLR operator 225, a deinterleaver 226, and an exclusive OR operator 227. Herein, the iterative channel decoder 220 repeats and decodes the output of the first SISO decoder 221 and the second SISO decoder 224.

That is, the first SISO decoder 221 outputs an additional bitstream LLR $L_e^{(1)}(\hat{b}_1^n)$ by inputting the video bitstream LLR $L(\hat{b}_1^n)$ and the parity bitstream LLR $L(\hat{p}_1^n)$. Herein, $L_e^{(j)}$ is defined as extrinsic information (EI) during j-th half for an iteration.

In addition, the additional bitstream LLR $L_e^{(1)}(\hat{b}_1^n)$ of the first SISO decoder 221 is transmitted to the interleaver 222 and the interleaver 222 rearranges the sequence of the additional bitstream LLR $L_e^{(1)}(\hat{b}_1^n)$ and then outputs an interleaved additional bitstream LLR $L_e^{(1)}(\hat{b}_1^n)$, in which the interleaved additional bitstream LLR $L_e^{(1)}(\hat{b}_1^n)$ is defined as $\Pi(L_e^{(1)}(\hat{b}_1^n))$.

As a result, the additional bitstream is generated by using the video bitstream and the parity bitstream by the first SISO decoder 221 and the interleaver 222 rearranges the sequence of the additional bitstream by using the generated additional bitstream to output the interleaved additional bitstream.

Further, the interleaved additional bitstream LLR $L_e^{(1)}(\hat{b}_1^n)'$ and the combined bitstream LLR $L(\hat{b}_{12}^n)$ are transmitted to the first LLR operator 223, and the first LLR operator 223 combines the interleaved additional bitstream LLR $L_e^{(1)}(\hat{b}_1^n)'$ and the combined bitstream LLR $L(\hat{b}_{12}^n)$ based on the LLR to generate a prior bitstream (Priori bit) LLR $L_a^{(1)}(\hat{b}_2^n)$. Herein, with respect to the interleaved additional bitstream LLR $L_e^{(1)}(\hat{b}_1^n)' = \Pi(L_e^{(1)}(\hat{b}_1^n))$, an exclusive OR is defined as $L(\hat{b}_1^n) \boxplus L(\hat{b}_{12}^n) \triangleq L(\hat{b}_1^n \oplus \hat{b}_{12}^n)$.

As a result, during the first half for an iteration decoding, the prior bitstream LLR $L_a^{(1)}(\hat{b}_2^n)$ and the de-mapped parity bitstream LLR $L(\hat{p}_{12}^n)$ are transmitted to the second SISO decoder 224 and the second SISO decoder 224 performs soft-decoding of the received prior bitstream LLR $L_a^{(1)}(\hat{b}_2^n)$ and the de-mapped parity bitstream LLR $L(\hat{p}_{12}^n)$.

Thereafter, during the second half for an iteration decoding, the SISO decoder 224 generates an additional bitstream LLR $L_e^{(2)}(\hat{b}_2^n)$ which is the EI for the prior bitstream LLR $L_a^{(1)}(\hat{b}_2^n)$ and the additional bitstream LLR $L_e^{(2)}(\hat{b}_2^n)$ is transmitted to the first SISO decoder 221 as prior information via the second LLR operator 225 and the deinterleaver 226 in sequence. As a result, the prior bitstream LLR $L_a^{(2)}(\hat{b}_1^n)$ transmitted to the first SISO decoder 221 is defined as $L_a^{(2)}(\hat{b}_1^n) = \Pi^{-1}(L_e^{(2)}(\hat{b}_2^n) \boxplus L(\hat{b}_{12}^n))$ and herein, $\Pi^{-1}(\ )$ is an deinterleaver. The channel decoding process is repetitively performed predetermined times. As a result, the video bitstream LLR $L(\hat{b}_1^n)$ is updated by the prior bitstream LLR $L_a^{(2)}(\hat{b}_1^n)$ and transmitted to the first SISO decoder 221, thereby improving reliability for the video bitstream LLR $L(\hat{b}_1^n)$.

In addition, video bitstreams $\hat{b}_1^n$ and $\hat{b}_2^n$ of the first SISO decoder 221 and the second SISO decoder 224 are output.

The prior information API of the additional bit LLR $L_e^{(1)}(\hat{b}_1^n)$ of the first SISO decoder 221 is transmitted to the next first SISO decoder 221 from the video bitstream LLR $L(\hat{b}_1'')$ and the parity bitstream LLR $L(\hat{p}_1'')$, thereby improving the reliability for the video bitstream LLR $L(\hat{b}_1'')$.

As a result, in the present invention, it is required to set the appropriate hierarchical value $\alpha$ for improving the reliability for the video bit $\hat{b}_1''$ and the combined bit $\hat{b}_{12}''$ at the same time.

The video bits $\hat{b}_1''$ and $\hat{b}_2''$ of the iterative channel decoder 220 are transmitted to the H264/AVC decoders 230 and 231, respectively, and the H264/AVC decoders 231 and 232 decode the video bits $\hat{b}_1''$ and $\hat{b}_2''$ to reconfigure the left and right video signals $\hat{V}_1$ and $\hat{V}_2$. In this case, the decoded video bits $\hat{b}_1''$ and $\hat{b}_2''$ are defined as the left and right video signals $\hat{V}_1$ and $\hat{V}_2$, and the left video signal $\hat{V}_1$ provides a legacy 2DTV (display device) service and is combined with the reconfigured right video signal $\hat{V}_2$ to provide a 3DTV service.

Hereinafter, with respect to the left and right video signals $\hat{V}_1$ and $\hat{V}_2$ acquired through the iterative channel decoding for the symbol vector y received from the destination node 20, a series of processes of updating the hierarchical value $\alpha$ in the model constructed in the source node 10 by acquiring the appropriate hierarchical value $\alpha$ based on the PSNR performance in the low SNR environment will be described.

That is, the quality of the left and right video signals $\hat{V}_1$ and $\hat{V}_2$ reconfigured in the destination node 20 is measured by the peak signal to noise ratio (PSNR) and the stereoscopic 3D video quality is measured based on the average PSNR. The average PSNR performance is determined by bit error rate (BER) performance and the average PSNR performance is determined depending on the hierarchical value $\alpha$.

Herein, the average PSNR for the left and right video signals $\hat{V}_1$ and $\hat{V}_2$ is represented by Equation 21 below.

$$PSNR_{Avg}(\hat{V}_\alpha) = \frac{1}{K}\Sigma_k^K PSNR(\hat{V}_{k,\alpha}) \qquad \text{Equation 21}$$

Herein, k is 1 and 2, $PSNR(\hat{V}_{k,\alpha})$ is defined as a k-th video PSNR of the given hierarchical value $\alpha$, and $PSNR(\hat{V}_{k,\alpha})$ is defined as Equation 22 below.

$$PSNR(\hat{V}_{k,\alpha}) = \frac{1}{I}\sum_{i=1}^{I} 10\log_{10}\left(\frac{MAX^2}{MSE_k(i)}\right) \qquad \text{Equation 22}$$

Herein, I represents a total number of frames and MAX represents a probable maximum pixel value in one frame. For example, in the case of 8 bits per one sample, a probable maximum pixel value is 255.

In addition, $MSE_k(i)$ is defined as a mean squared error (MSE) in an I-th frame of the k-th video and $MSE_k(i)$ satisfies Equation 23 below.

$$MSE = \frac{1}{W \times H}\sum_{w=1}^{W}\sum_{h=1}^{H}(ori(w,h) - rec(w,h))^2 \qquad \text{Equation 23}$$

Herein, ori and rec represent an original frame and a reconfigured frame, and W and H represent a height and a width of the frame.

If such an average PSNR exceeds the target PSNR and the PSNR of each video does not reach a minimum required value, a low-quality stereoscopic 3D video is viewed. For example, when the target average PSNR is set as 30 dB, a sum of the left and right PSNRs needs to exceed 60 dB to reach the target average PSNR. If the left and right PSNRs are 40 dB and 20 dB, respectively, the target average PSNR is satisfied, but the quality of the stereoscopic 3D video is gradually deteriorated because the right video has a low PSNR.

As a result, the left video and right video average PSNRs need to exceed the minimum required PSNR, and the sum of the left video and right video average PSNRs needs to acquire the hierarchical value $\alpha$ exceeding the target average PSNR from a predetermined model.

Accordingly, the average PSNR for the left and right video signals $\hat{V}_1$ and $\hat{V}_2$ needs to satisfy Equations 24 to 26 below.

$$\underset{\alpha}{\text{argmax}}\, PSNR_{Avg}(\hat{V}_\alpha) \qquad \text{Equation 24}$$

Herein, $$NR_{Avg}(\hat{V}_\alpha) \geq PSNR_{Avg}^+(\hat{V}_\alpha), \forall\alpha \qquad \text{Equation 25}$$

$$PSNR(\hat{V}_{k,\alpha}) \geq PSNR^-(\hat{V}_{k,\alpha}), k=1,2, \forall\alpha \qquad \text{Equation 26}$$

Herein, $PSNR_{Avg}^+$ and $PSNR^-$ represent the target average PSNR of the left and right videos and the minimum required PSNR, respectively.

In this case, the left video and right video average PSNRs need to exceed the minimum required PSNR and the sum of the left video and right video average PSNRs a model for acquiring the hierarchical value $\alpha$ in which the sum of the left video and right video average PSNRs exceeds the target average PSNR is constructed as follows.

Figure 5:
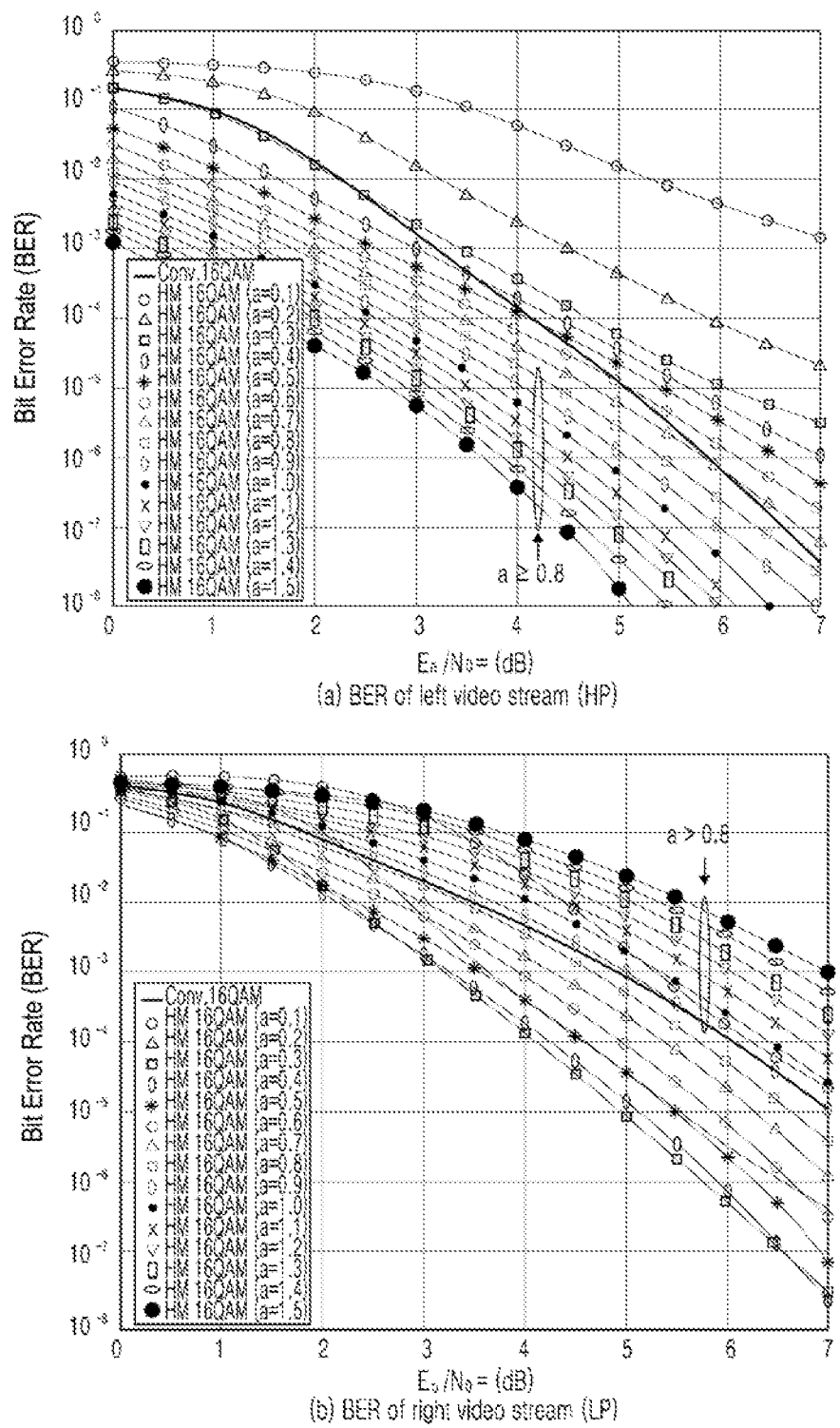
FIG. 5 is an exemplary diagram showing a BER of each of a left video and a right video at the time of iterative decoding three times of the iterative channel decoder in the broadcasting system according to the exemplary embodiment of the present invention.

FIG. 5 is a diagram showing BER performance in the case of repeating the channel decoding of the decoded bit $\hat{b}_1''$ (left video, HP bit) and bit $\hat{b}_2''$ (right video, LP bit) three times. Referring to (a), it can be seen that when the hierarchical value $\alpha$ is equal to or more than 0.8, the BER performance of the HP stream of the left video $\hat{b}_1$ using the hierarchical 16QAM mapping model is higher than that of a general 16 QAM mapping model. Referring to (b), it can be seen that when the hierarchical value $\alpha$ is less than 0.8, the BER performance of the HP stream of the left video $\hat{b}_1$ using the hierarchical 16QAM mapping model is lower than that of a general 16 QAM mapping model. As a result, the BER performance of the HP bit is improved as the hierarchical value $\alpha$ is increased and the BER performance of the LP bit is improved as the hierarchical value $\alpha$ is decreased. However, the BER of the LP bit decoded by the second SISO decoder 224 directly affects the reliability of the HP bit decoded by the first SISO decoder 221. Accordingly, as illustrated in (b), the BER of the LP bit is degraded when the hierarchical value $\alpha$ is between 0.1 to 0.2.

That is, when the hierarchical value $\alpha$ is between 0.1 to 0.2, the BER performance of the LP bit is excessively decreased and the LP bit LLR extracted by the network decoding causes the decrease in performance, and it may be represented by a Relation Equation 27 below.

$$L(\hat{b}_1'') \boxplus L(\hat{b}_{12}'') = L(\hat{b}_2'') \qquad \text{Equation 27}$$

As a result, when the minimum required PSNR is set to 28 dB and the target average PSNRs are set to 33 dB and 38 dB, respectively, the PSNR of 28 dB represents the low quality of the reconfigured video, the PSNR of 38 dB represents the high quality of the reconfigured video, and the PSNR of 33 dB is considered as intermediate quality of the reconfigured video.

Figure 6:
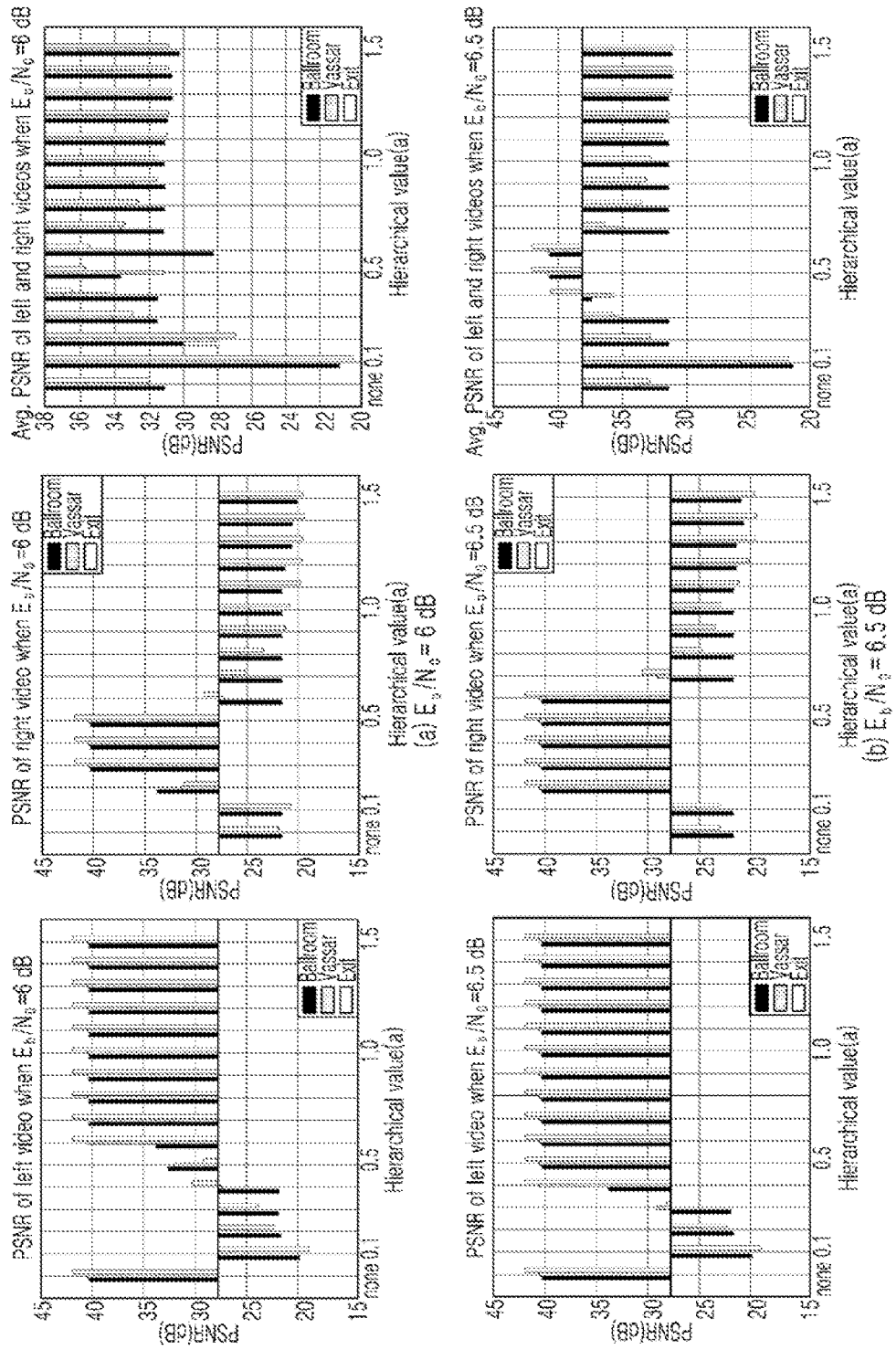
FIG. 6 is an exemplary diagram showing left, right, and average PSNR performances when a target average PSNR and a minimum required PSNR are 38 dB and 28 dB, respectively, according to the exemplary embodiment of the present invention.

FIG. 6 (a) is an exemplary diagram illustrating leftmost, middle, and rightmost PSNR performance when $E_b/N_0=6$ dB, and the hierarchical value α of the PSNR of the left video satisfies the minimum required PSNR as a value except for 0.1 to 04, while the hierarchical value α of the right video PSNR satisfies the minimum required PSNR as 0.2 to 0.5, but herein, a value on an X axis represents a typical minimum required value of 16QAM.

However, it can be seen that even though the hierarchical value α is increased further than the minimum required PSNR of the left and right videos, the average PSNRs of the left and right videos do not reach the target average PSNR.

(b) is an exemplary diagram showing PSNR performance when $E_b/N_0=6.5$ dB, and it can be seen that most of hierarchical values α except for 0.1 to 0.3 satisfy the minimum required PSNR, while the hierarchical values α of 0.2 to 0.6 with respect to the PSNR of the right video is satisfied. As illustrated in the average PSNR of FIG. 6B, it can be seen that the hierarchical values α of 0.5 and 0.6 are increased compared with the target average PSNR set to 38 dB. As compared with the general 16QAM having the hierarchical values α of 0.5 and 0.6, the average PSNR is increased by about 7.3 dB to 9.3 dB.

Accordingly, it can be seen that when $E_b/N_0=6$ dB to 6.5 dB, the hierarchical value α is 0.5 to 0.6.

Figure 7:
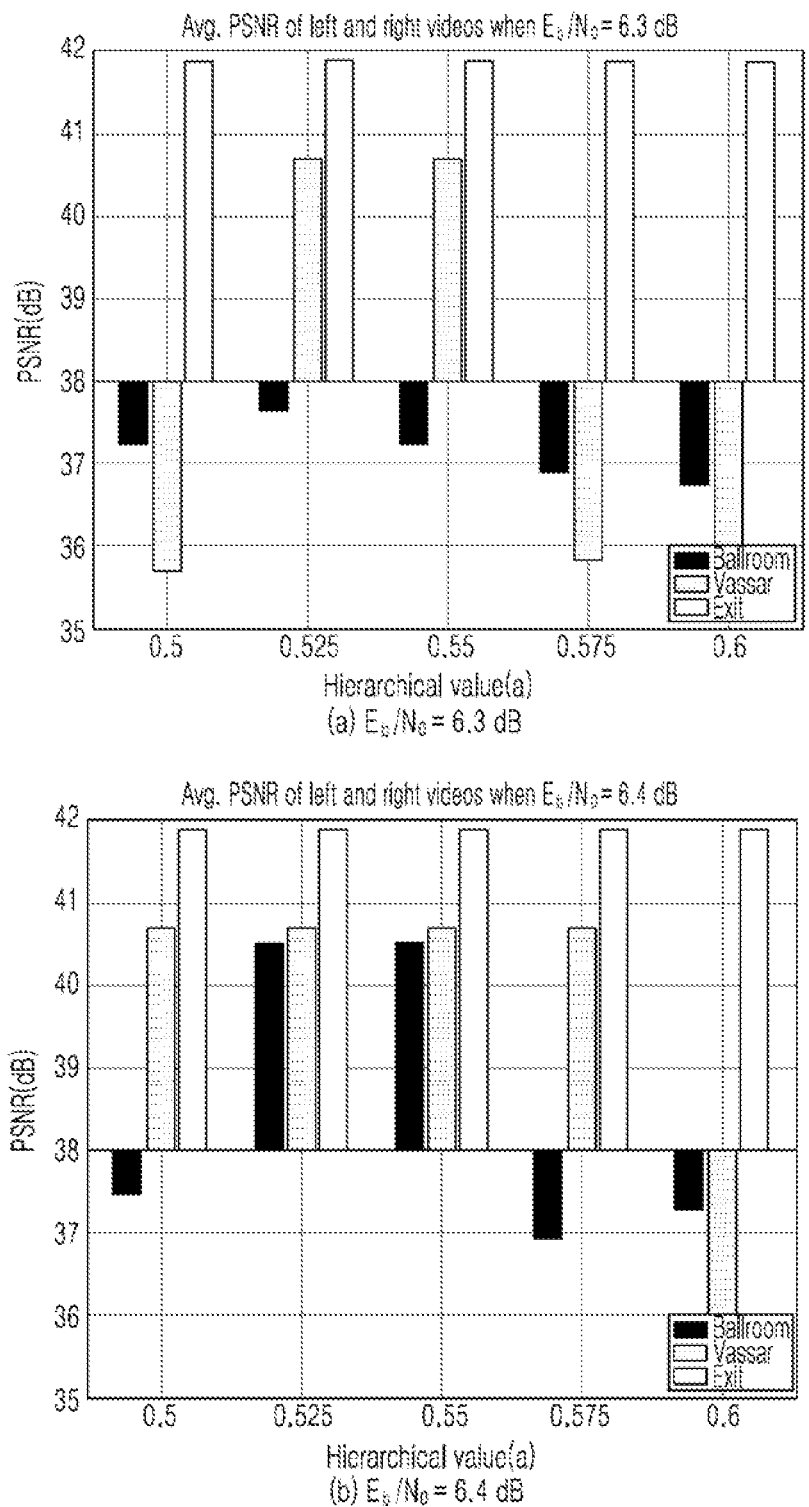
FIG. 7 is an exemplary diagram showing average PSNR performance when a target average PSNR is set to 38 dB and hierarchical values are set to 0.5 and 0.6 according to the exemplary embodiment of the present invention.

FIG. 7 is a diagram showing average PSNR performance of left and right videos for a hierarchical value α every period of 0.025 between 0.5 and 0.6. Referring to (a), it can be seen that in a lower test sequence than a low motion sequence, when $E_b/N_0=6.3$ dB, some or partial target average PSNR is not satisfied.

Figure 8:
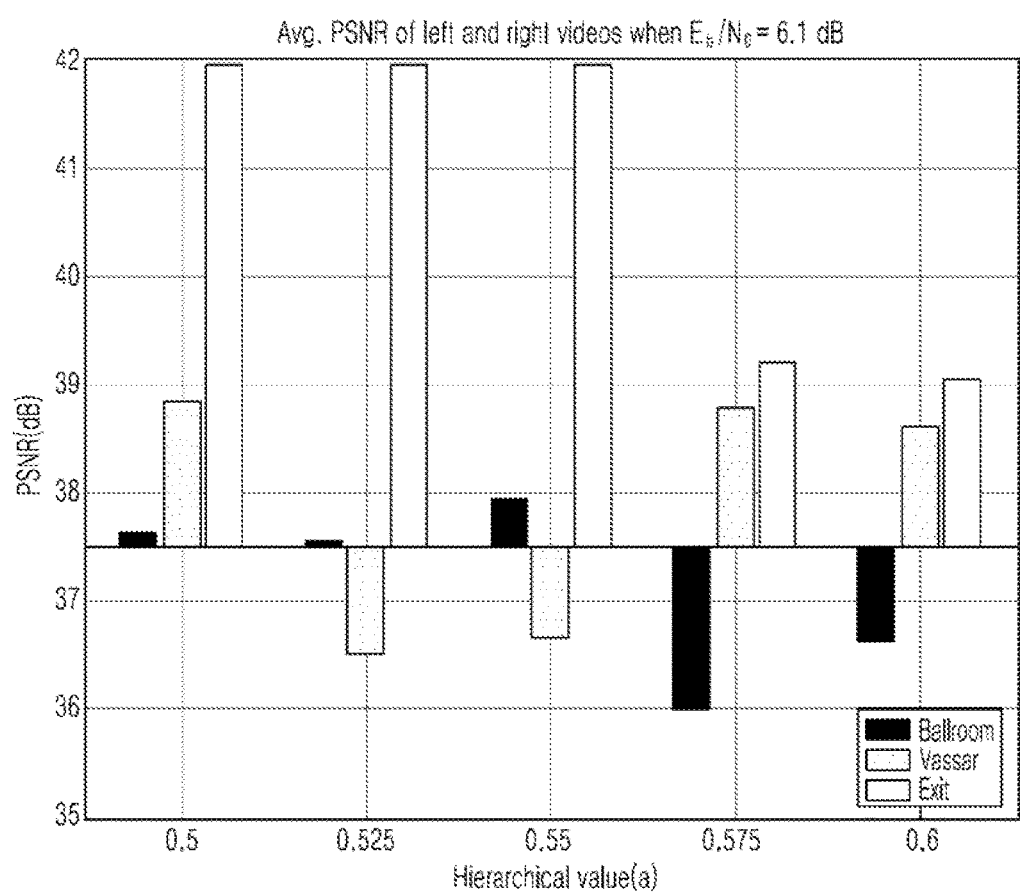
FIG. 8 is an exemplary diagram showing average PSNR performance of $E_b/N_0=6.1$ dB when a target average PSNR is set to 33 dB and hierarchical values are set to 0.5 and 0.6 according to the exemplary embodiment of the present invention.

Meanwhile, referring to (b), when $E_b/N_0=6.4$ dB, the hierarchical values α of 0.525 and 0.55 reach the target average PSNR and have the same performance even when the target average PSNR is 38 dB. Similarly, when the target average PSNR is set to 33 dB, as illustrated in FIG. 8, it can be seen that the hierarchical value α of 0.5 satisfies the target average PSNR at $E_b/N_0=6.1$ dB.

As a result, in order to acquire the high-quality stereoscopic video in a low SNR environment, the hierarchical values α of 0.525 and 0.55 are selected, and in order to acquire the intermediate-quality stereoscopic video in a low SNR environment, the hierarchical value α of 0.5 is selected.

Accordingly, it can be seen that the LLR operation complexity of each of the HP bitstream and the LP bitstream is low through logarization for the probability $P(b_m|y)$ that the video bit br (r=1, 2, 3, 4) for the given reception symbol vector y is to be transmitted, and as a result, a de-mapping processing speed for the reception symbol vector y is improved.

Further, the prior information API of the additional bit LLR $L_e^{(1)}(\hat{b}_1'')$ of the first SISO decoder 221 is transmitted to the next first SISO decoder 221 from the video bitstream LLR $L(\hat{b}_1'')$ and the parity bitstream LLR $L(\hat{p}_1'')$, thereby improving the reliability for the video bitstream LLR $L(\hat{b}_1'')$.

Meanwhile, according to another aspect of the present invention, a method for broadcasting a stereoscopic 3D video may include a transmission step of transmitting a left video and a right video collected by a plurality of cameras in a transmission symbol vector form by performing 16QAM modulation and hierarchical modulation based on hierarchical values set from a predetermined model after compressing the left video and the right video; and a reception step of acquiring the left video and the right video by performing iterative channel decoding after performing hierarchical 16QAM de-mapping based on an appropriate hierarchical value and transmitting the acquired left and right videos to a display device with respect to a reception symbol vector in which Gaussian noise is added to the transmission symbol vector at a source node side. The process of performing the hierarchical 16QAM de-mapping based on the predetermined hierarchical value may include providing each operation relation of a LP codeword bitstream LLR and a HP codeword bitstream LLR drawn through logarization for the probability that the received reception symbol vector is to be transmitted as the four fundamental arithmetic operations, in order to reduce operation complexity of the LP codeword bitstream LLR and the HP codeword bitstream LLR.

Further, the iterative channel decoding process may include generating an additional bit stream by performing soft decoding by the first SISO decoder by inputting a left video bitstream and a parity bitstream; rearranging a sequence of the additional bitstream and then transmitting the rearranged sequence to the second SISO decoder as an input; performing soft decoding by inputting the additional bitstream rearranged in the second SISO decoder and the parity bit; generating a prior bitstream of the left video after inverse-arranging the sequence through deinterleaving for the additional bitstream; and updating the left video bitstream by providing the prior bitstream of the left video of the deinterleaver to the first SISO decoder through an exclusive OR operation to improve reliability of the decoding for the left video.

In addition, the process of acquiring the appropriate hierarchical value may include acquiring bit error rate (BER) performance based on noise for each predetermined hierarchical value of left and right video bitstreams output from the first and second SISO decoders; setting a hierarchical value having the acquired low BER performance; drawing an average PSNR for each of the left video bitstream and the right video bitstream reconfigured based on the predetermined hierarchical value; and acquiring, as the appropriate hierarchical value, a hierarchical value in which a sum of the drawn left video bitstream and right video bitstream exceeds a predetermined target average PSNR and each average PSNR has a predetermined minimum required PSNR. The detailed abstraction will be omitted as a function in which each step of the method for broadcasting the stereoscopic 3D video is performed in the source node 10 and the destination node 20 described above.

According to the apparatus and the method for broadcasting the stereoscopic 3D video, the LLR operation of each of the HP bitstream and the LP bitstream is provided by the four fundamental arithmetic operations through the logarization for the probability that a video bit for the reception symbol vector is to be transmitted, thereby lowering the operation complexity of the HP bitstream LLR and the LP bitstream LLR and improving the de-mapping processing speed for the reception symbol vector y. When performing the iterative channel decoding, the iterative channel decoding is performed by acquiring, as the appropriate hierarchical value, a hierarchical value in which a sum of the drawn left video bitstream and right video bitstream exceeds a predetermined target average PSNR and each average PSNR has a predetermined minimum required PSNR, thereby displaying a high-quality stereoscopic video. In addition, the left video bitstream is updated by providing the prior bitstream of the left video to the first SISO decoder, thereby improving reliability of the decoding for the left video. Therefore, the present invention is the industrially available invention in that it is possible to make a very great improvement in terms of performance efficiency as well as accuracy of the operation and reliability, a possibility that the broadcasting system is commercially available is sufficient and the present invention may be practically clearly implemented.

A number of exemplary embodiments have been described above. Nevertheless, it should be understood that various modifications may be made to these exemplary embodiments. For example, suitable results may be achieved if the described techniques are performed in a different order and/or if components in a described system, architecture, device, or circuit are combined in a different manner and/or replaced or supplemented by other components or their equivalents. Therefore, the scope of the present invention should not be limited to the exemplary embodiment and should be defined by the appended claims to be described below and equivalents to the appended claims.

What is claimed is:

1. An apparatus for broadcasting a stereoscopic 3D video, the apparatus comprising:
    a source node that transmits a left video and a right video collected by a plurality of cameras in a transmission symbol vector form by performing 16QAM modulation and hierarchical modulation based on hierarchical values set from a predetermined model after compressing the left video and the right video; and
    a destination node that acquires the left video V1 and the right video V2 by performing iterative channel decoding after performing hierarchical 16QAM de-mapping based on a predetermined hierarchical value and transmits the acquired left and right videos to a display device with respect to a reception symbol vector in which Gaussian noise is added to the transmission symbol vector at the source node side,
    wherein the source node includes:
    an IL-FEC channel encoding unit that generates a combined video bitstream b12 by combining compressed left video bitstream b1 and right video bitstream b2 of NAL units and performing an exclusive OR operation with respect to the left video VI and the right video V2 collected through the plurality of cameras;
    an RSC encoding unit including a plurality of RSC encoders that output parity bitstreams P1 and P2 of the left video and the right video by performing RSC encoding for the compressed left video b1 bitstream and right video bitstream b2;
    a concatenate vector generation processor that generates a codeword bitstream c1 of the left video and a codeword bitstream c12 of the combined video by concatenating the left video bitstream b1, the right video bitstream b2, the parity bitstream P2 of the right video, and the combined video bitstream b12 and outputs the generated codeword bitstream c1 of the left video and codeword bitstream c12 of the combined video to a HP bitstream and a LP bitstream, respectively; and
    a hierarchical 16QAM mapping processor that maps the HP bitstream and LP bitstream after performing both 16QAM and hierarchical modulation based on the hierarchical value set from the predetermined model to transmit the mapped HP bitstream and LP bitstream to the destination node in a transmission symbol vector form,
    wherein the IL-FEC channel encoding unit includes:
    an interleaver that combines the compressed left video bitstream b1 and right video bitstream b2; and
    an exclusive OR operator that outputs a combined video bitstream by operating an exclusive OR with respect to the output bitstream and the right video bitstream of the interleaver,
    wherein the destination node includes:
    a hierarchical 16QAM de-mapper that acquires the hierarchical value and performs the hierarchical 16QAM de-mapping based on the acquired hierarchical value, and then outputs a left video bitstream LLR, a parity bitstream LLR, a combined video bitstream LLR and a parity bitstream LLR by operating the HP codeword bitstream LLR and the LP codeword bitstream LLR, with respect to the reception symbol vector in which Gaussian noise is added to the transmission symbol vector of the source node side, respectively;
    an iterative channel decoder that acquires a left video stream and a right video stream by performing a predetermined number of iterative channel decoding with respect to the generated left video bitstream LLR, parity bitstream LLR, combined video bitstream LLR and parity bitstream LLR; and
    an encoding unit including a plurality of encoders that transmits a left video and a right video to a display device after compressing and encoding the acquired left and right video bitstreams, respectively,
    wherein in the hierarchical 16QAM de-mapper,
    each operation relation of a LP codeword bitstream LLR and a HP codeword bitstream LLR drawn through log likelihood ratio operation for the probability that the received reception symbol vector is to be transmitted is provided by fundamental arithmetic operations, in order to reduce operation complexity of the LP codeword bitstream LLR and the HP codeword bitstream LLR, and
    wherein the iterative channel decoder includes:
    a first SISO decoder that generates an additional bitstream LLR by performing soft decoding by inputting the left video bitstream LLR and the parity bitstream LLR and outputs the left video bitstream;
    an interleaver that outputs an interleaved additional bitstream LLR by rearranging a sequence of the additional bitstream LLR of the first SISO decoder;
    a first LLR operator that generates a prior bitstream of the right video by combining the interleaved additional bitstream and the combined video bitstream as the input based on the LLR;
    a second SISO decoder that generates an additional bitstream of the left video and outputs the right video bitstream by soft decoding the prior bitstream of the right video and the parity bitstream of the combined video of the first LLR operator as the input;
    a second LLR operator that generates an additional bitstream of the left video by combining the additional bitstream of the right video of the second SISIO decoder and the combined video bitstream based on the LLR;
    a deinterleaver that generates a prior bitstream of the left video through deinterleaving and exclusive OR operation with respect to the additional bitstream of the left video; and
    an exclusive OR operator that updates the left video bitstream by providing the prior bitstream of the left video of the deinterleaver to the first SISO decoder through the exclusive OR operation to improve reliability of the decoding for the left video.

2. The apparatus of claim 1, wherein the hierarchical value is provided to
- acquire bit error rate (BER) performance based on noise for each predetermined hierarchical value of left and right video bitstreams output from the first and second SISO decoders of the iterative channel decoder,
- set a hierarchical value having the acquired low BER performance, draw an average PSNR for each of the left video bitstream and the right video bitstream reconfigured based on the predetermined hierarchical value, and
- acquire, as the appropriate hierarchical value, a hierarchical value in which a sum of the drawn left video bitstream and right video bitstream exceeds a predetermined target average PSNR and each average PSNR has a predetermined minimum required PSNR.

3. An apparatus for broadcasting a stereoscopic 3D video, the apparatus comprising:
- a hierarchical 16QAM de-mapper that acquires an appropriate hierarchical value, performs the hierarchical 16QAM de-mapping based on the acquired hierarchical value, with respect to the reception symbol vector, and then outputs a left video bitstream LLR, a parity bitstream LLR, a combined video bitstream LLR and a parity bitstream LLR by operating the LP codeword bitstream LLR and the HP codeword bitstream LLR, respectively;
- an iterative channel decoder that acquires a left video stream and a right video stream by performing a predetermined number of iterative channel decoding with respect to the generated left video bitstream LLR, parity bitstream LLR, combined video bitstream LLR and parity bitstream LLR; and
- an encoding unit including a plurality of encoders that transmits a left video and a right video to a display device after compressing and encoding the acquired left and right video bitstreams, respectively,
- wherein in the hierarchical 16QAM de-mapper, each operation relation of a LP codeword bitstream LLR and a HP codeword bitstream LLR drawn through log likelihood ratio operation for the probability that the received reception symbol vector is to be transmitted is provided by fundamental arithmetic operations, in order to reduce operation complexity of the LP codeword bitstream LLR and the HP codeword bitstream LLR, and
- wherein the iterative channel decoder includes:
- a first SISO decoder that generates an additional bitstream LLR by performing soft decoding by inputting the left video bitstream LLR and the parity bitstream LLR and outputs the left video bitstream;
- an interleaver that outputs an interleaved additional bitstream LLR by rearranging a sequence of the additional bitstream LLR of the first SISO decoder;
- a first LLR operator that generates a prior bitstream of the right video by combining the interleaved additional bitstream and the combined video bitstream as the input based on the LLR;
- a second SISO decoder that generates an additional bitstream of the left video and outputs the right video bitstream by soft decoding the prior bitstream of the right video and the parity bitstream of the combined video of the first LLR operator as the input;
- a second LLR operator that generates an additional bitstream of the left video by combining the additional bitstream of the right video of the second SISIO decoder and the combined video bitstream based on the LLR;
- a deinterleaver that generates a prior bitstream of the left video through deinterleaving and exclusive OR operation with respect to the additional bitstream of the left video; and
- an exclusive OR operator that updates the left video bitstream by providing the prior bitstream of the left video of the deinterleaver to the first SISO decoder through the exclusive OR operation to improve reliability of the decoding for the left video.

4. The apparatus of claim 3, wherein the hierarchical value is provided to
- acquire bit error rate (BER) performance based on noise for each predetermined hierarchical value of left and right video bitstreams output from the first and second SISO decoders of the iterative channel decoder,
- set a hierarchical value having the acquired low BER performance, draw an average PSNR for each of the left video bitstream and the right video bitstream reconfigured based on the predetermined hierarchical value, and
- acquire, as the appropriate hierarchical value, a hierarchical value in which a sum of the drawn left video bitstream and right video bitstream exceeds a predetermined target average PSNR and each average PSNR has a predetermined minimum required PSNR.

5. A method for broadcasting a stereoscopic 3D video, the method comprising:
- transmitting a left video and a right video collected by a plurality of cameras in a transmission symbol vector form by performing 16QAM modulation and hierarchical modulation based on hierarchical values set from a predetermined model after compressing the left video and the right video; and
- acquiring the left video and the right video by performing iterative channel decoding after performing hierarchical 16QAM de-mapping based on an appropriate hierarchical value and transmitting the acquired left and right videos to a display device with respect to a reception symbol vector in which Gaussian noise is added to the transmission symbol vector at the source node side,
- wherein the process of performing the hierarchical 16QAM de-mapping based on the predetermined hierarchical value further includes
- providing each operation relation of a LP codeword bitstream LLR and a HP codeword bitstream LLR drawn through log likelihood operation for the probability that the received reception symbol vector is to be transmitted as fundamental arithmetic operations, in order to reduce operation complexity of the LP codeword bitstream LLR and the HP codeword bitstream LLR,
- wherein the iterative channel decoding process includes
- generating an additional bitstream by performing soft decoding by the first SISO decoder by inputting a left video bitstream and a parity bitstream;
- rearranging a sequence of the additional bitstream and then transmitting the rearranged sequence to the second SISO decoder as an input;
- performing soft decoding by inputting the additional bitstream rearranged in the second SISO decoder and the parity bit;

generating a prior bitstream of the left video after inverse-arranging the sequence through deinterleaving for the additional bitstream; and updating the left video bitstream by providing the prior bitstream of the left video of the deinterleaver to the first SISO decoder through an exclusive OR operation to improve reliability of the decoding for the left video.

6. The method of claim 5, wherein the process of acquiring the appropriate hierarchical value includes:

acquiring bit error rate (BER) performance based on noise for each predetermined hierarchical value of left and right video bitstreams output from the first and second SISO decoders;

setting a hierarchical value having the acquired low BER performance;

drawing an average PSNR for each of the left video bitstream and the right video bitstream reconfigured based on the predetermined hierarchical value; and acquiring, as the appropriate hierarchical value, a hierarchical value in which a sum of the drawn left video bitstream and right video bitstream exceeds a predetermined target average PSNR and each average PSNR has a predetermined minimum required PSNR.

* * * * *

UNITED STATES PATENT AND TRADEMARK OFFICE
CERTIFICATE OF CORRECTION

PATENT NO. : 10,499,034 B2
APPLICATION NO. : 15/809478
DATED : December 3, 2019
INVENTOR(S) : Dong Ho Kim and Dongho You Page 1 of 1

It is certified that error appears in the above-identified patent and that said Letters Patent is hereby corrected as shown below:

In the Claims

Claim 1, Column 19, Line 42, replace "with respect to the left video VI and the right video V2" with --with respect to the left video V1 and the right video V2--

Claim 1, Column 19, Line 47, replace "encoding for the compressed left video b1 bitstream" with --encoding for the compressed left video bitstream b1--

Signed and Sealed this
Fourth Day of February, 2020

Andrei Iancu
*Director of the United States Patent and Trademark Office*